B. M. W. HANSON.
CONTOUR CUTTER MILLING MACHINE.
APPLICATION FILED AUG. 15, 1917.

1,302,541.

Patented May 6, 1919.
7 SHEETS—SHEET 1.

Fig. 1.

INVENTOR
Bengt M. W. Hanson,
BY S. Jay Teller
ATTORNEY

B. M. W. HANSON.
CONTOUR CUTTER MILLING MACHINE.
APPLICATION FILED AUG. 15, 1917.

1,302,541.

Patented May 6, 1919.
7 SHEETS—SHEET 4.

INVENTOR
Bengt M. W. Hanson
BY S. Jay Teller
ATTORNEY

B. M. W. HANSON.
CONTOUR CUTTER MILLING MACHINE.
APPLICATION FILED AUG. 15, 1917.

1,302,541.

Patented May 6, 1919.
7 SHEETS—SHEET 5.

INVENTOR
Bengt M. W. Hanson
BY S. Jay Teller
ATTORNEY

UNITED STATES PATENT OFFICE.

BENGT M. W. HANSON, OF HARTFORD, CONNECTICUT, ASSIGNOR TO PRATT & WHITNEY COMPANY, OF NEW YORK, N. Y., A CORPORATION OF NEW JERSEY.

CONTOUR-CUTTER MILLING-MACHINE.

1,302,541.      Specification of Letters Patent.      Patented May 6, 1919.

Application filed August 15, 1917. Serial No. 186,298.

*To all whom it may concern:*

Be it known that I, BENGT M. W. HANSON, a citizen of the United States, residing at Hartford, in the county of Hartford and State of Connecticut, have invented certain new and useful Improvements in Contour-Cutter Milling-Machines, of which the following is a specification.

The invention relates especially to milling machines adapted and intended for cutting the longitudinal grooves in rotary cutters such as are used on milling machine. The machine is primarily intended for cutting the grooves in "formed" cutters, that is, cutters with more or less irregular contours, but it will be obvious that the machine is not limited to work of this class.

One of the objects of the invention is to provide, in a machine of the general class specified, improved means for effecting relative movement between the operating cutter and the cutter blank being operated upon, this means comprising a pattern or former which serves to guide or control the relative movements. Another object of the invention is to provide improved mechanism, preferably weight controlled, for coöperating with the former to guide and control the movements. A further object of the invention is to provide an improved feeding mechanism for the work-carrying table and improved means for stopping the operation of the feeding mechanism at a predetermined point. Still further objects will be apparent from the following specification and claims.

In the accompanying drawings I have illustrated the embodiment of my invention which I now deem preferable, but it will be understood that the drawings are for illustrative purposes only and that many changes and substitutions of equivalents can be made without departing from the spirit of the invention as set forth in the claims appended to this specification.

Figure 1:
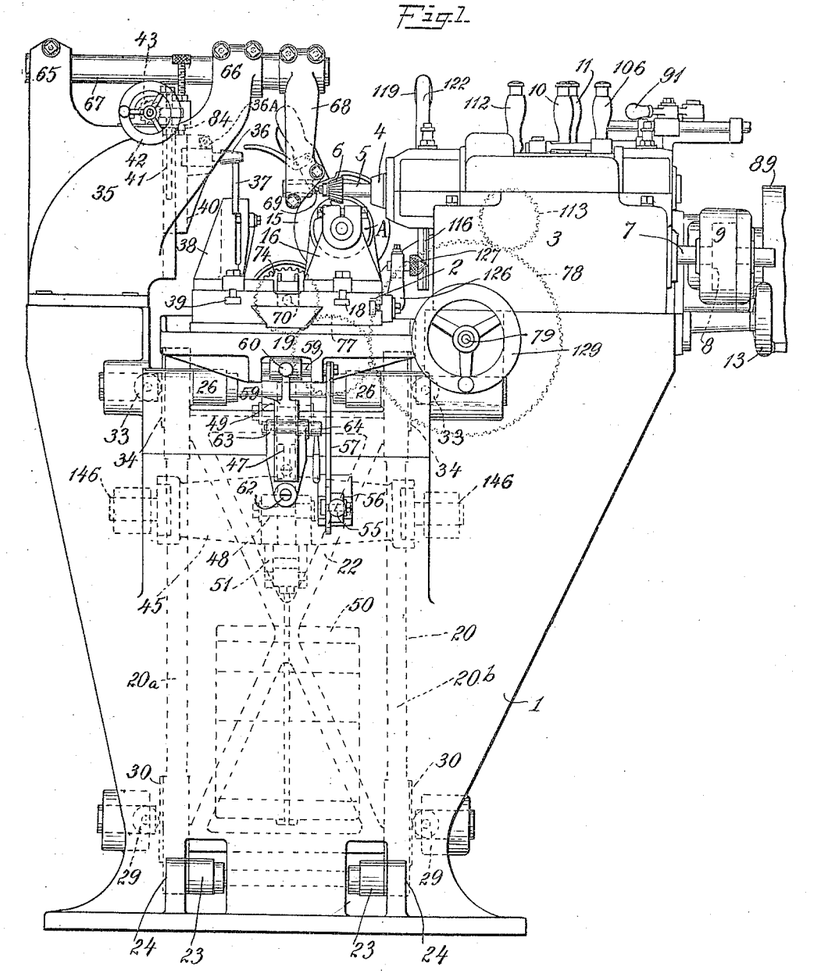
Figure 1 is a front elevation of the machine.
Figure 2:
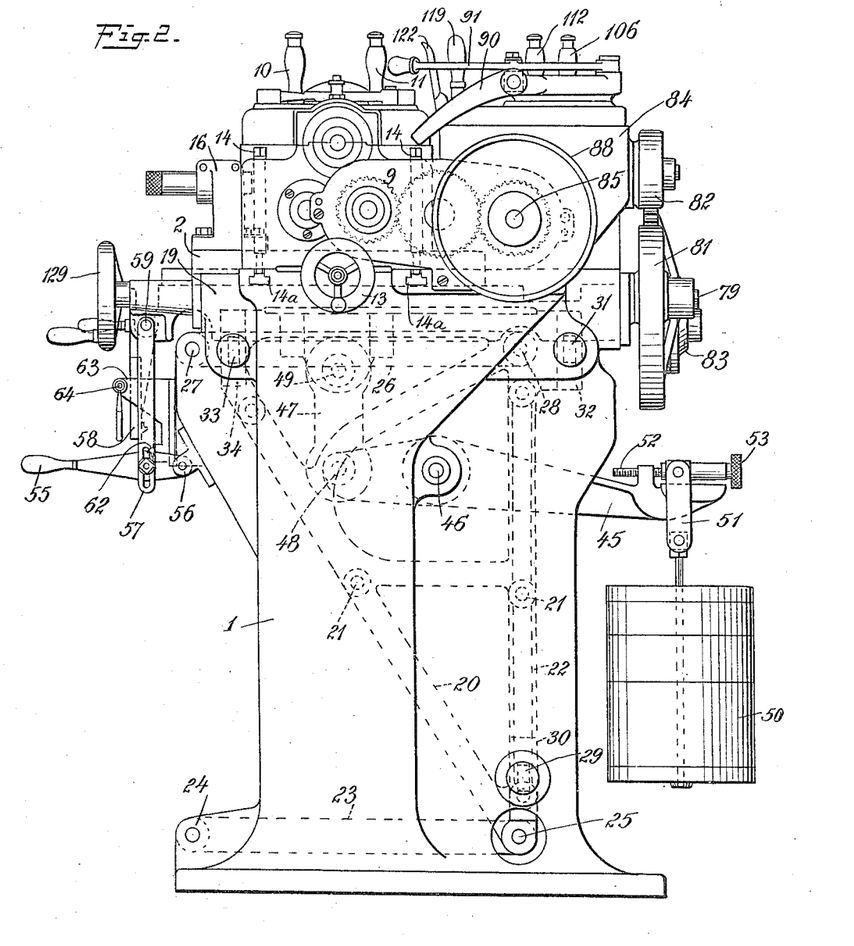
Fig. 2 is a side elevation.

Referring to the drawings, particularly Figs. 1 and 2, 1 represents, as a whole, the main base or housing by which all of the other parts of the machine are carried either directly or indirectly. The machine comprises a work-carrying table 2, which is movable forward and backward, and a headstock 3 by means of which the operating cutter is supported and driven.

Figures 4, 10:
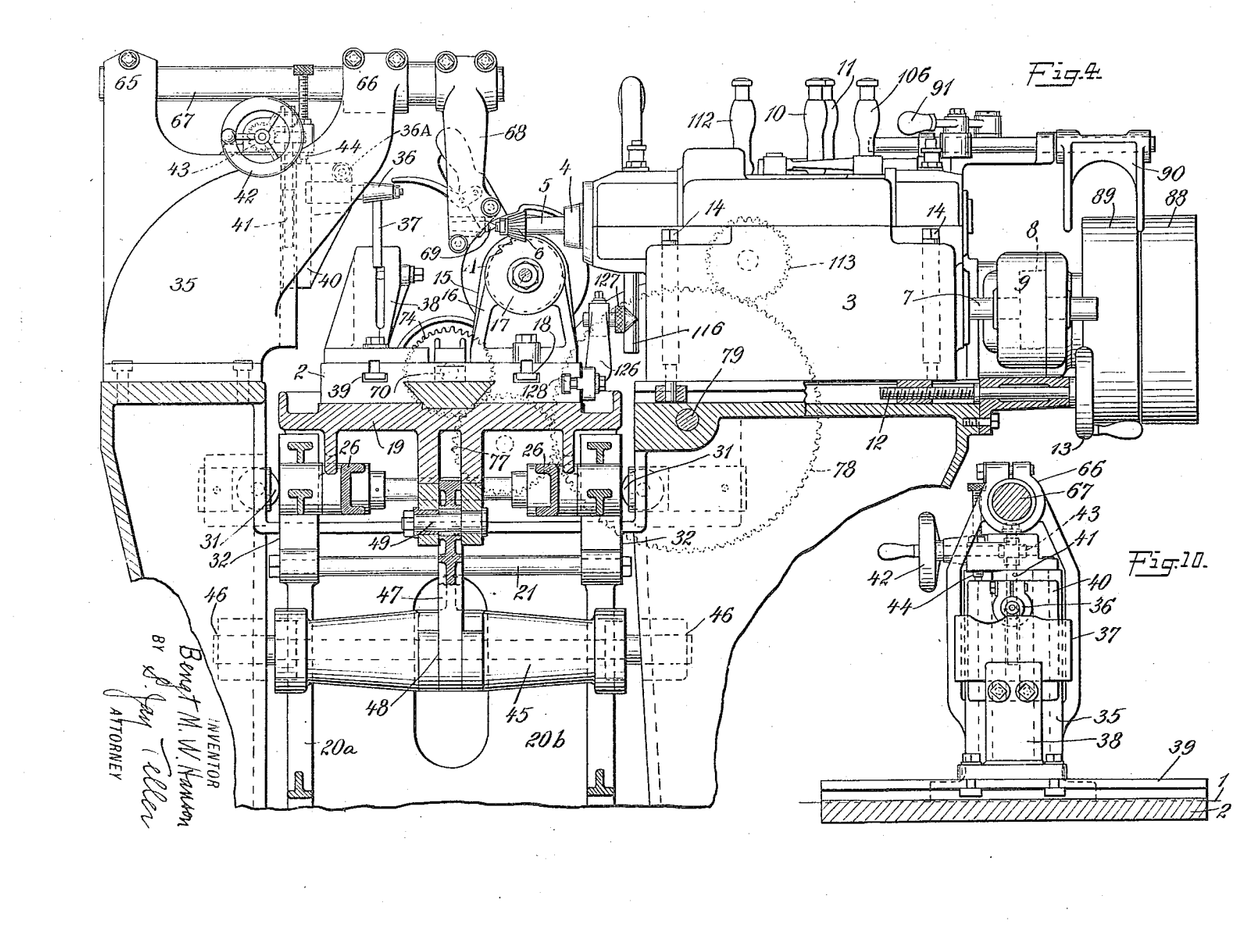
Fig. 4 is a fragmentary vertical transverse view partly in elevation and partly in section along the line 4—4 of Fig. 3.
Fig. 10 is a fragmentary vertical sectional and elevational view taken along the line 10—10 of Fig. 3.

The details of construction of the headstock form no part of my present invention, and it is therefore not necessary to fully illustrate or describe these details. It is sufficient to point out that the headstock comprises a spindle 4 in which may be mounted in any usual or preferred manner an arbor 5 carrying a cutter 6. Power is supplied to the headstock through a shaft 7 which is driven by means of a train gearing 8 inclosed in a box or casing 9. Interposed between the shaft 7 and the spindle 4 is suitable change-speed gearing which is not shown. This gearing may be controlled by means of suitable hand levers 10 and 11. The headstock 3 is transversely adjustable along suitable guideways formed in the headstock 1. As shown in Fig. 4, the transverse movement of the headstock may be controlled by means of a screw 12 which is provided with a hand wheel 13. The final gear of the train 8 is splined to the shaft 7, thus permitting the horizontal adjustment of the headstock 3. After adjustment the headstock can be locked in adjusted position by means of bolts 14, 14 provided at their lower ends with nuts which are seated in suitable T-slots 14$^a$, 14$^a$ in the housing.

The work-carrying table 2 is provided with an index head 15 and with a tailstock 16 upon which the blank to be cut is mounted by means of an arbor 17 in the usual way. The index head and the tailstock can be of any usual or preferred construction and it is not necessary to describe them in detail. It is sufficient to point out that they are adapted to be secured to the work table by means of bolts engaging a T-slot 18. The T-slot is parallel with the longitudinal lines of the table and the cutter blank is supported with its axis horizontal and exactly at right angles to the axis of the spindle 4 and of the cutter 6.

Means are provided whereby relative vertical movement is effected between the cutter blank and the operating cutter 6 so that cutting may be effected as required in accordance with the contour of the blank. Preferably the headstock 3 with the operating cutter is fixed against any vertical movement and the work table with the cutter blank is moved vertically as is necessary. As concerns some of the features of my invention, I do not limit myself to any particular means or mechanism for supporting the table or for controlling or guiding its vertical movement. I have found it highly preferable, however, to provide a mechanism such as will now be described in detail.

The table 2 is longitudinally movable along ways formed upon a carriage 19, the carriage being substantially fixed against horizontal movement in any direction but being freely movable vertically in the manner to be described. Connected with or formed integrally with the carriage, as may be deemed expedient, is a framework 20 which is generally triangular in longitudinal outline, as clearly appears in Fig. 2. As is shown in Fig. 4, the framework 20 comprises two sections 20$^a$ and 20$^b$ which are connected at intervals by transverse tie rods 21 and by a transverse truss member 22 which is shown in dotted lines in Fig. 1. It will be seen that the framework 20 taken with the carriage 19 and the several connecting elements constitute one rigid structure which is vertically movable within the housing 1. For guiding the vertical movement of this structure there are provided two substantially horizontal links 23, 23 near the bottom, which are pivoted respectively to the housing at 24 and to the framework 20 at 25; and there are provided two other substantially horizontal links 26, 26 which are pivoted respectively to the housing 1 at 27 and to the framework 20 at 28. The links 23, 23 and 26, 26 are equal in length and they therefore constitute parallel motion links which serve to hold the framework 20 and the carriage 19 in exact parallelism while permitting vertical movement.

As already stated, the links 23, 23 and 26, 26 act as parallel motion links to hold the table and framework in parallelism, and it will be obvious that these links will serve to prevent any forward or backward horizontal movement of the carriage or framework, excepting, of course, the small movement incidental to the arcuate path of the pivots 25 and 28. The links can not, however, be depended upon for preventing transverse movements of the carriage and framework. I therefore provide a plurality of rollers on each side for preventing any transverse horizontal movements. As clearly appears in Figs. 1 and 2, two opposed rollers 29, 29 are provided near the bottom of the housing 1, and these respectively engage tracks 30, 30 formed respectively on the frame members 20$^a$ and 20$^b$. Near the top of the housing 1 there are provided two opposed rollers 31, 31 respectively engaging tracks 32, 32 on the frame members and two other opposed rollers 33, 33 respectively engaging tracks 34, 34. The rollers therefore prevent any horizontal movement of the carriage transversely, while the links prevent any free horizontal movement of the carriage longitudinally. The carriage is freely movable vertically as already stated, but is firmly guided so that other movements are prevented.

As has already been stated, the table 2 is longitudinally movable along the carriage 19. Suitable feed mechanism is provided for moving the carriage which will be fully described hereinafter. Mounted on the housing 1 at a point which is preferably substantially opposite the headstock 3 is a bracket 35. Carried respectively by the bracket 35 and by the table 2 are two co-operating elements which control and determine the vertical movements of the table as the table is moved longitudinally. In order that the vertical movements of the table may be properly correlated with the longitudinal movements, one of the aforesaid elements is a pattern or "former" which has a shape definitely related to the contour of the blank to be operated upon. Preferably, and as illustrated, I provide a normally stationary pin 36 carried by the bracket 35 and an elongated former 37 carried by the table. The former 37 is a metal plate having its upper edge shaped as required; and this plate is detachably mounted in a vise 38 which is adjustably secured to the table by means of T-bolts entering a longitudinal T-slot 39. The former pin 36 is carried by a slide 40 which is vertically movable along ways formed upon the side of the bracket 35. The pin can be clamped in place by a screw 36ᵃ. A screw 41 is provided for vertically moving the slide, and this screw is operated by means of a hand wheel 42 which is connected through spiral gearing 43. Preferably there is provided a stop to limit the upward movement of the slide 40, this stop being in the form of an adjustable screw 44.

Suitable mechanism is provided for automatically holding the carriage 19 and the table 2 in their uppermost positions, that is, with the former 37 in firm engagement with the former pin 36. This mechanism preferably comprises a lever 45 which is pivoted to the housing 1 at 46. A vertical link 47 connects one end of the lever 45 with the carriage 19, this link being pivoted to the lever at 48 and to the carriage at 49. Preferably the bearings at 48 and at 49 are anti-friction roller or ball bearings. The lever 45 carries at the end opposite the pivot 48 a weight 50 which is suspended by means of a link 51. This link is preferably adjustable longitudinally of the lever by means of a screw 52 carrying a knob 53. It will be seen that the weight tends to swing the lever in the clockwise direction as viewed in Fig. 2, thus providing an upward thrust through the link 47 and applying an upward pressure to the carriage and the table. The carriage and the table are moved upward so that the former 37 is at all times held in firm engagement with the former pin 36. It will be observed that the axis of the thrust link 47 is in the vertical plane of the cutter 6 and of the former pin 36, thus applying the upward pressure substantially directly without any tendency to effect twisting or cause incidental stresses.

While the vertical movements of the table are normally controlled by the weight acting in conjunction with the former, I prefer to provide means whereby the action of the weight can be supplemented or varied manually. Sometimes when a very heavy cut is being taken it is necessary to increase the upward pressure beyond that normally applied by the weight, and at other times, particularly when use is being made of a former with very deep recesses, it is necessary to oppose the weight in order that the former pin may not form a locking engagement with the former. In order that the operator may either assist or oppose the weight and push upward or pull downward on the table, I preferably provide a hand lever 55 which is pivotally connected with the main housing at 56. A vertical link 57 connects the lever with the carriage so that the operator, by pressing on the lever, can exert pressure on the carriage in either direction as required.

It is frequently desirable to lock the carriage and table in their lower positions, as, for instance, when it is desired to remove the former 37 and replace it. It is also frequently desirable to lock or clamp the carriage in some intermediate position, as, for instance, when the machine is to be used for a cylindrical blank. In order that the table may be thus locked or clamped against vertical movement, I provide a latch 58 which is pivoted to the carriage at 59 and is preferably provided with a handle 60. A coil spring 61 holds the latch in its normal position as shown. Mounted on the housing 1 is a catch 62 which is adapted to be engaged by the latch when the carriage is in its lower position. It is therefore only necessary for the operator to move the carriage and table downward as, for instance, by means of the lever 55, whereupon the latch engages the catch and holds the parts in lower position. They can be released simply by moving the latch by means of the handle 60. In order that the carriage with the table may be locked in an intermediate position, I provide two ears 63, 63 which extend outward from the housing at opposite sides of the latch 58. The sides of the latch are parallel and fit closely between the ears. A clamping screw 64 extends through the two ears and by turning this screw the two ears can be forced together into firm frictional contact with the latch, thus locking the table in any desired position.

Preferably, though not necessarily, I provide an outboard bearing or support for the cutter arbor 5, this bearing being carried by the aforesaid bracket 35. In performing work of the character for which this machine is adapted, it is frequently necessary to use quite small cutters and correspondingly small arbors. These small arbors must be supported at both ends in order that high grade work may be done. As illustrated, the bracket 35 is provided with two seats 65 and 66 which hold an over-arm 67. The over-arm is longitudinally adjustable in the seats 65 and 66 and can be clamped in place by means of the clamping bolts which are provided. The over-arm 67 carries a depending bearing bracket 68 in which is mounted a center 69 in axial alinement with the spindle 4 and the arbor 5. As shown in Fig. 4, the center is in engagement with the arbor and provides a supporting bearing therefor.

As concerns the mechanism for feeding the table 2 longitudinally, there can be wide variation, but the mechanism which I have shown and will now describe, is satisfactory and has certain important advantages. Connected with the carriage 2 is a longitudinal feed screw 70 which is non-rotative. Carried by the carriage is a bracket 71 to which is secured a bearing sleeve 72 concentric with the feed screw. Rotatable in the sleeve 72 is a bushing 73 which carries at one end a spur gear 74. Splined within the bushing are two feed nuts 75 and 76 which engage the feed screw 70. One of these nuts is engaged by a threaded bushing 76ª by means of which any wear of the nuts or of the screw can be taken up, thus preventing backlash or lost motion.

Figures 6, 7, 8:
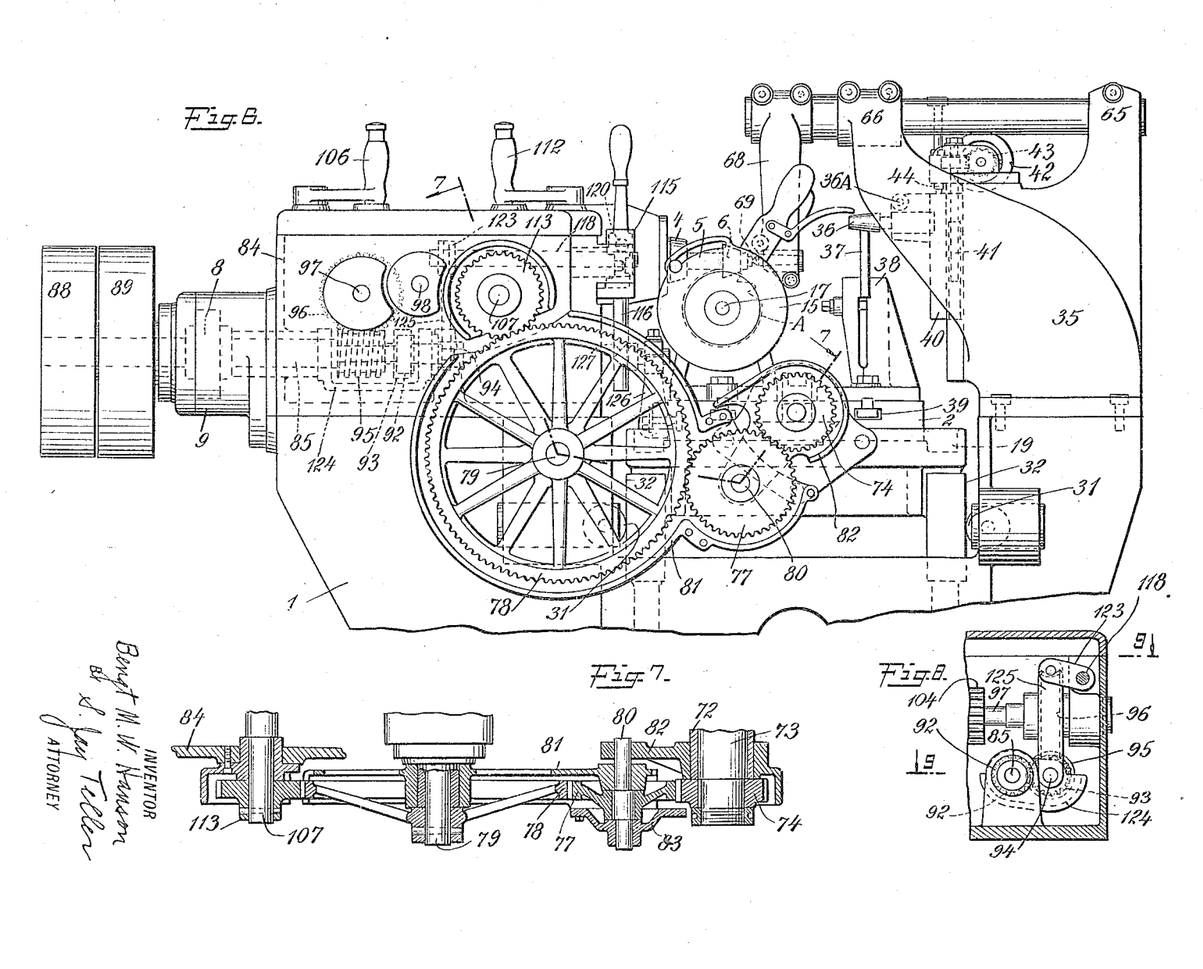
Fig. 6 is a fragmentary rear view of the machine.
Fig. 7 is a fragmentary sectional view taken along the broken line 7—7 of Fig. 6.
Fig. 8 is a fragmentary vertical sectional view taken along the lines 8—8 of Figs. 3 and 9.

As shown in Figs. 6 and 7, the gear 74 meshes with a gear 77 which in turn meshes with a large gear 78 mounted on a shaft 79 which extends longitudinally of the machine. The intermediate gear 77 is mounted on a floating shaft or pin 80 which is supported in part by a link 81 having a bearing on the hub of the wheel 78 and in part by a link 82 having a bearing on the sleeve 72 which is concentric with the gear 74. Preferably the link 81 is enlarged and extended to provide a casing for inclosing the greater part of the periphery of the gear 78, and similarly the link 82 is preferably extended to provide a casing for inclosing the greater part of the periphery of the gear 74. The casing for the gear 79 preferably has connected to it a cap 83 which covers the flange of the gear 77 and is provided with a supplemental bearing for the shaft 80. It will be seen that the floating gear 77 provides a means for transmitting power from the gear 78 to the gear 74 without interfering with the free vertical movement of the last said gear. The link 82 and the gear 74 can move axially relatively to the shaft 80 and the gear 77 respectively to permit the slight horizontal movement of the carriage incidental to the swinging of the parallel motion links.

For driving the gear 78 and the parts connected therewith, there is provided a train of gearing which is positioned in or carried by a housing or casing 84. The main drive shaft 85 extends into this housing and is provided outside of the housing with bearings 86 and 87. At the outer end of the shaft 85 is a driving mechanism, preferably in the form of tight and loose belt pulleys 88 and 89. Associated with these pulleys is a belt shifter 90 controllable by a lever 91. The aforesaid train of gears 8 for driving the shaft 7 has its initial member connected to the shaft 85, the casing 9 extending to the rear to surround the shaft and inclose the said initial gear.

The shaft 85 carries a pinion 92 which meshes with a similar pinion 93 on a short transverse shaft 94. Connected with the gear 93 is a worm 95 which meshes with a worm wheel 96 secured to a longitudinal shaft 97 mounted in suitable bearings in the casing 84. Parallel with the shaft 97 and also carried by the casing 84 is a shaft 98 on which is mounted a rotatable bushing 99. Fixedly secured to the bushing 99 are three differently diametered gears 100, 101, 102 and splined to the shaft 97 are two gears 103 and 104 adapted respectively to mesh with the gears 100 and 101. The gears 103 and 104 are longitudinally movable under the control of a rocker arm 105 and a hand lever 106. Also mounted in the casing 84 is a third longitudinal shaft 107. Splined to this shaft are three differently diametered gears 108, 109 and 110 which are adapted respectively to mesh with the gears 100, 101 and 102. The gears 107, 108 and 109 can be moved longitudinally by means of a rocker arm 111 and the hand lever 112. The shaft 107 carries a gear 113 which meshes with the aforesaid gear 78.

It will be seen that the gearing which I have described provides means for transmitting power from the main drive shaft 85 to the gear 78 and thence to the feed nuts 75 and 76 which serve to move the table longitudinally for feeding. By means of the hand levers 106 and 112 the gears can be shifted to provide for feeding at different speeds as required. When the lever 106 is in neutral position the power connection is broken.

Figures 3, 9:
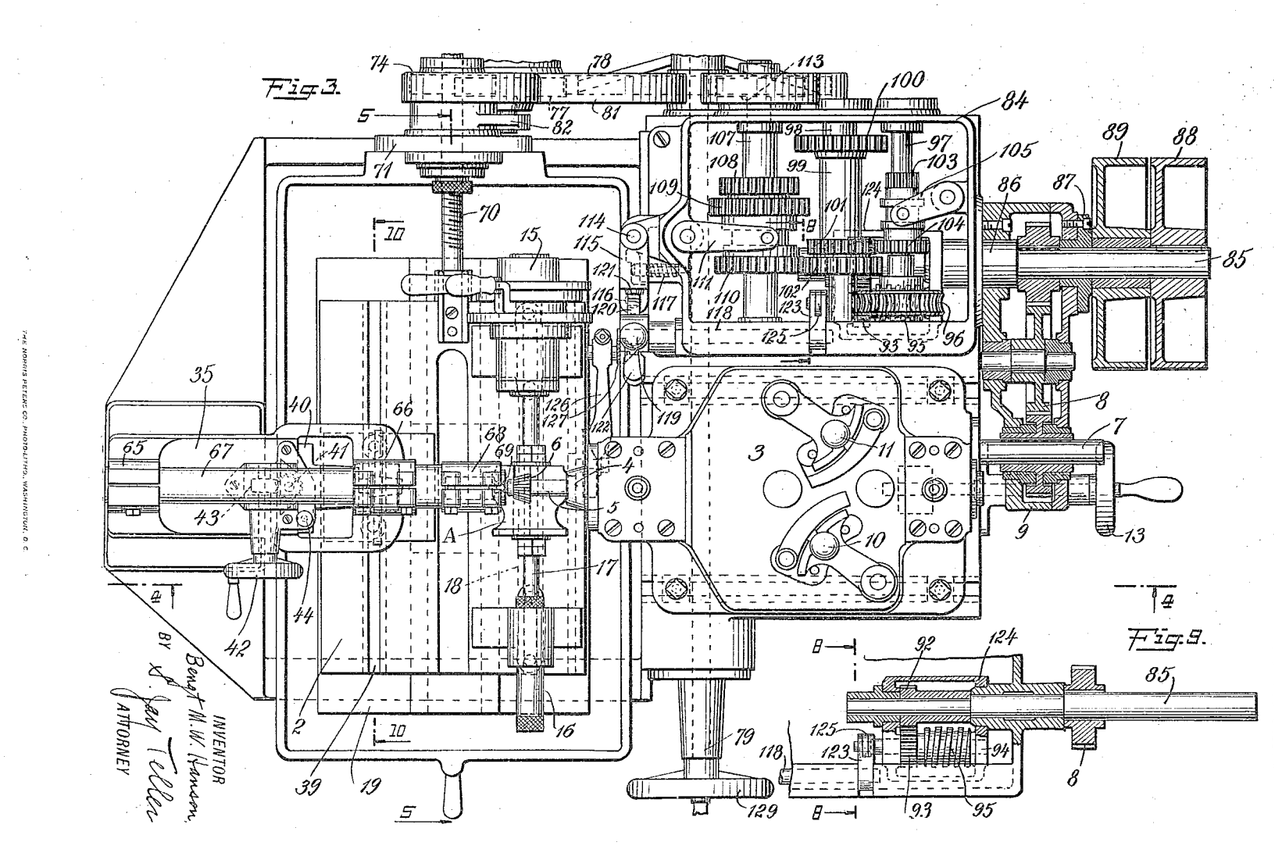
Fig. 3 is a fragmentary plan view, certain of the parts being broken away and other of the parts being shown in section.
Fig. 9 is a horizontal sectional view taken along the line 9—9 of Fig. 8.
Figure 5:
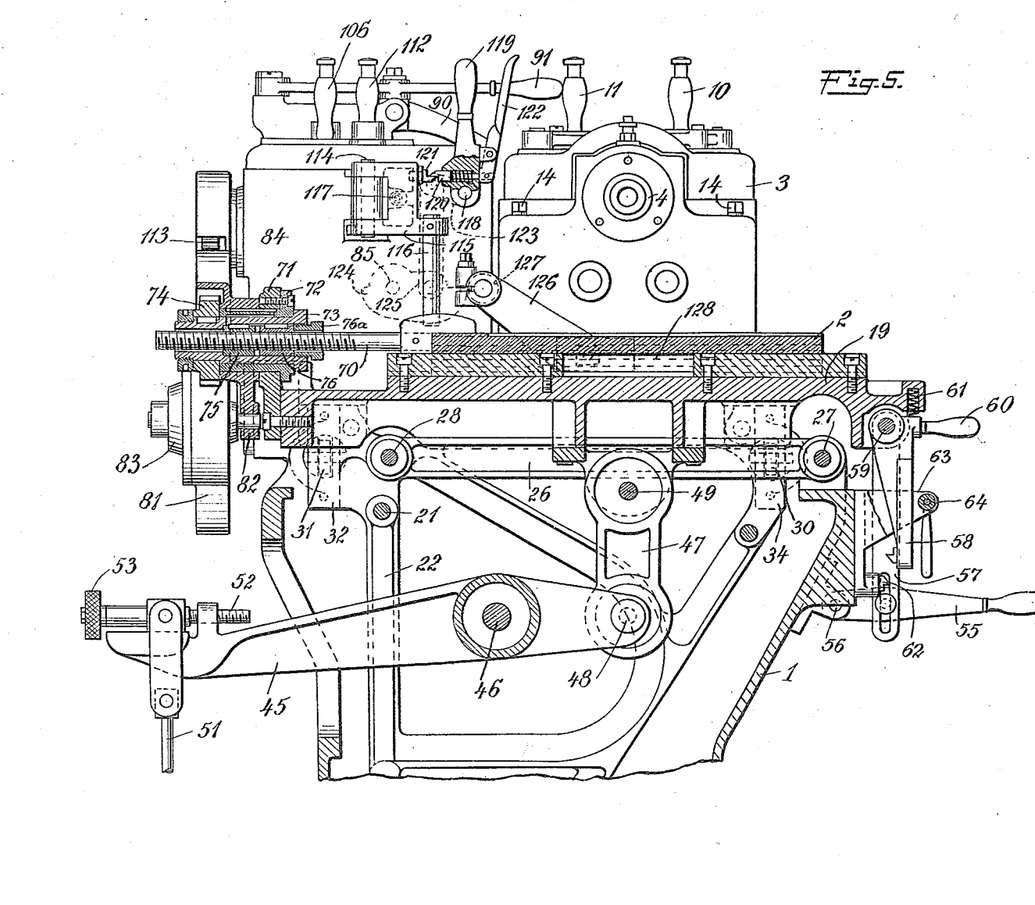
Fig. 5 is a fragmentary longitudinal vertical sectional view taken along the line 5—5 of Fig. 3.

I preferably provide means whereby the feeding of the table can be automatically stopped at any desired predetermined point. The preferred mechanism for this purpose will now be described. Vertically pivoted on the casing 84 at 114 is an arm 115 which carries a vertically depending finger 116. The arm 115 is normally held in its outermost position as shown in Fig. 3 by means of a spring 117. Pivotally mounted in the casing 84 is a transverse rock shaft 118 which is provided at its outer end with an upward extending hand lever 119. Mounted in the hand lever 119 is a transversely movable latch 120 adapted to engage with a lug 121 carried by the arm 115. The latch 120 is normally spring-pressed outward but can be moved inward by means of the latch lever 122. The rock shaft 118 carries a lever 123 which extends toward the rear of the machine. The aforesaid shaft 94 which carries the pinion 93 and the worm 95 is not fixedly mounted but is carried by a cradle 124 which is rotatable about the axis of the shaft 85. When the worm is in its normal operative position it engages the worm wheel 96, but when the cradle is lowered the worm is moved out of engagement with the worm wheel, thus breaking the power connection. A link 125 extends downward from the rock shaft 123 and is pivotally connected at its lower end with the cradle 124. The parts are so proportioned and connected that when the latch 120 is engaged with the lug 121, as shown in Fig. 5, the worm 95 is held in engagement with the worm wheel 96. If, however, the latch and the lug be disengaged, either by swinging the lever 115 and the lug toward the casing 84, or by withdrawing the latch by means of the lever 122, the worm is permitted to drop downward out of engagement with the worm wheel.

Secured to the table 2 is a bracket 126 carrying a pin 127 having a conical end. The bracket is adjustable along the table and can be clamped in place by means of a bolt which enters a T-slot 128 in the edge of the table. The pin 127 is so positioned with respect to the finger 116 that as the table is moved longitudinally the pin engages the finger to force it sidewise carrying with it the lever 115 and the lug 121. As soon as the lug disengages the latch 120 the worm drops out of engagement with the worm wheel, thus stopping the feed. It will be obvious that the feed can be stopped manually at any time by simply moving the lever 122 to release the latch. To start the feed again the operator simply swings the lever 119 to its normal position as shown in Fig. 5.

In order that the table may be moved manually, particularly for the purpose of returning it to its starting position after a cut has been finished, I provide a hand wheel 129 which is connected to the forward end of the aforesaid shaft 79. It will be observed that when the the worm 95 is disengaged from the worm wheel 96 all of the gears are free to be turned when the hand wheel 129 is rotated.

In operation, the blank to be milled or "gashed" is mounted on the index head 15 and the tailstock 16 by means of the arbor 17 in the usual way. A blank so mounted is shown at A in Fig. 3. A former 37 is selected which has a shape which is definitely related to the contour of the cutter blank A, and this former is clamped in place in the vise 38, as shown. The vise, with the former, is adjusted longitudinally of the table to bring the former pin 36 into the same longitudinal relation to the former as the cutter 6 bears to the blank A. The former pin 36 is adjusted vertically by means of the screw 41 to provide the desired size of cut in the blank.

After these preliminary adjustments have been made the feed is started by pulling on the hand lever 119, thus engaging the worm 95 with the worm wheel 96, it being understood that the table is initially in a forward position. By means of the change-speed gearing, a rate of feed can be selected which is adapted for the size of the cut. As the table is moved slowly backward the blank is carried underneath the cutter and the blank is moved upward and downward as required under the guidance of the former 37 so that the groove or gash varies in depth, that is, in distance from the axis. After the completion of one groove or gash, the pin 127 engages the finger 116, thus stopping the feed in the manner already described. Then the operator returns the table to its forward position by means of the hand wheel 129, and, if desired, the table may be lowered during such return movement by means of the hand lever 55 so as to avoid the marring of the finished cut by the rotating cutter 6. The blank is then indexed in the usual way by means of the index head 15 and the feed is again started, as before described. These operations are repeated until the completion of a series of grooves or gashes extending entirely around the cutter.

Figure 11:
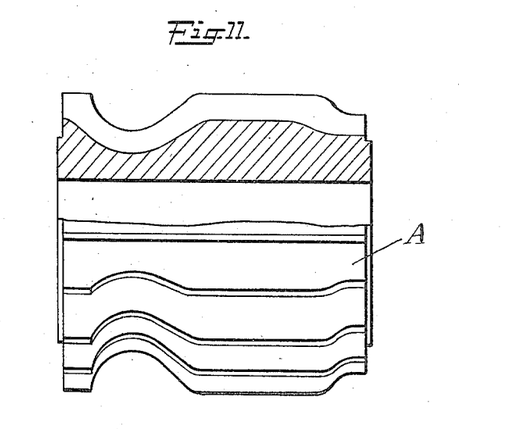
Fig. 11 is a view, partly in section, of a cutter of the type which my improved machine is adapted to mill.
Figure 12:
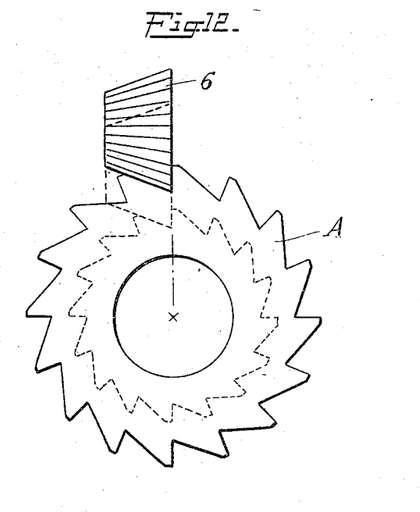
Fig. 12 is an end view of the cutter shown in Fig. 11, two of the relative positions of the operating cutter being indicated by dot and dash lines.

The depth of each groove or gash is so controlled that the "land" between it and the preceding groove or gash is of uniform width from one end of the cutter to the other. From an inspection of Fig. 12 it will be clear that in order to provide a "land" of uniform width it is necessary for the bottom of each groove to have a contour which differs considerably from the external contour of the cutter. The contour of the bottom of a groove is indicated in Fig. 11 and it will be obvious that the former 37 must have a similar contour. The former can be constructed and provided with the proper contour in any desired way, but I prefer to generate it in accordance with the disclosure in my copending application for Method of and apparatus for generating formers for milling machines, Ser. No. 186,299, filed on even date herewith.

Figure 13:
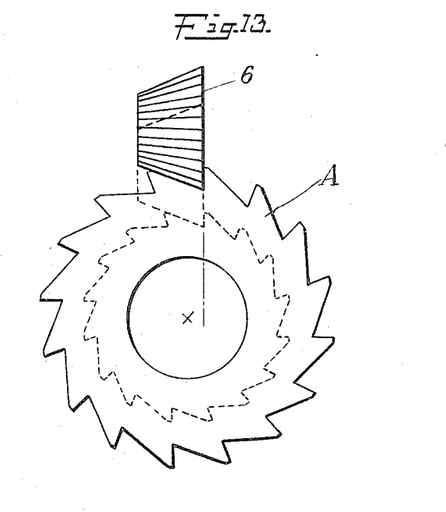
Fig. 13 is an end view of a cutter having the teeth slightly undercut.

It is frequently desirable to slightly undercut each tooth of the cutter so as to provide a sharper cutting angle. This can be readily done by adjusting the headstock 3 to move the cutter 6 to a relative position such as indicated in Fig. 13.

One of the advantageous features of my invention is the provision of the parallel motion links and rollers for guiding the vertical movements of the carriage. By this means I prevent any binding or cramping of the carriage such as would be likely to occur if slots and guideways of the usual type were provided. The location of the thrust link on the weight applies the pressure to the carriage in a way to largely eliminate any tendency to twisting or turning of the table, and this, in coöperation with the links and rollers, entirely eliminates any such action.

What I claim is:

1. In a milling machine, the combination of a rotatable horizontal cutter-carrying spindle, a table longitudinally movable at an angle to the spindle, longitudinally arranged means on the table for holding a blank in operative relation to a cutter on the spindle, guiding means permitting relative vertical movements in parallelism between the cutter and the table, and a former and a former pin arranged to engage each other one being associated with the table and the other with the cutter spindle, whereby relative vertical movements to control the depth of cut may be effected simultaneously with the horizontal movements of the table.

2. In a milling machine, the combination of a rotatable horizontal cutter-carrying spindle, a table longitudinally movable at an angle to the spindle, longitudinally arranged means on the table for holding a blank in operative relation to a cutter on the spindle, guiding means permitting relative vertical movements in parallelism between the cutter and the table, and a former and a former pin automatically held in engagement with each other one being associated with the table and the other with the cutter spindle, whereby relative vertical movements to control the depth of cut are effected simultaneously with the horizontal movements of the table.

3. In a milling machine, the combination of a rotatable horizontal cutter-carrying spindle, a table longitudinally movable at an angle to the spindle, longitudinally arranged means on the table for holding a blank in operative relation to a cutter on the spindle and for indexing it to present successive parts thereof to the cutter, guiding means permitting relative vertical movements in parallelism between the cutter and the table, and a former and a former pin arranged to engage each other one being associated with the table and the other with the cutter spindle, whereby relative vertical movements to control the depth of cut may be effected simultaneously with the horizontal movements of the table.

4. In a milling machine, the combination of a rotatable horizontal cutter-carrying spindle, a table longitudinally movable at an angle to the spindle, means for adjusting the spindle in a horizontal plane relatively to the lines of table movement, longitudinally arranged means on the table for holding a blank in operative relation to a cutter on the spindle, guiding means permitting relative vertical movements in parallelism between the cutter and the table, and a former and a former pin arranged to engage each other one being associated with the table and the other with the cutter spindle, whereby relative vertical movements to control the depth of cut may be effected simultaneously with the horizontal movements of the table.

5. In a milling machine, the combination of a rotatable horizontal cutter-carrying spindle, a table longitudinally movable at an angle to the spindle, longitudinally arranged means on the table for holding a blank in operative relation to a cutter on the spindle, guiding means permitting relative vertical movements in parallelism between the cutter and the table, a former and a former pin arranged to engage each other one being associated with the table and the other with the cutter spindle, whereby relative vertical movements to control the depth of cut may be effected simultaneously with the horizontal movements of the table, and means whereby relatively longitudinal adjustment may be effected between the former and the pin.

6. In a milling machine, the combination of a rotatable horizontal cutter-carrying spindle, a table longitudinally movable at an angle to the spindle, longitudinally arranged means on the table for holding a blank in operative relation to a cutter on the spindle, guiding means permitting relative vertical movements in parallelism between the cutter and the table, a former and a former pin arranged to engage each other one being associated with the table and the other with the cutter spindle, whereby relative vertical movements to control the depth of cut may be effected simultaneously with the horizontal movements of the table, and means associated with the former and former pin for effecting vertical adjustment to change the depth of cut.

7. In a milling machine, the combination of a rotatable horizontal cutter-carrying spindle normally fixed against bodily movement, a table horizontally movable at an angle to the spindle, longitudinally arranged means on the table for holding a blank in operative relation to a cutter on the spindle, guiding means permitting vertical movements of the table in parallelism, and a former and a former pin arranged to engage each other one being associated with the table and the other with the cutter spindle, whereby vertical movements of the table to vary the depth of cut may be effected simultaneously with the horizontal movements of the table.

8. In a milling machine, the combination of a rotatable horizontal cutter-carrying spindle normally fixed against bodily movement, a table horizontally movable at an angle to the spindle, longitudinally arranged means on the table for holding a blank in operative relation to a cutter on the spindle, guiding means permitting vertical movements of the table in parallelism, and a former and a former pin automatically held in engagement with each other one being associated with the table and the other with the cutter spindle, whereby vertical movements of the table to vary the depth of cut are effected simultaneously with the horizontal movements of the table.

9. In a milling machine, the combination of a rotatable horizontal cutter-carrying spindle normally fixed against bodily movement, a table horizontally movable at an angle to the spindle, longitudinally arranged means on the table for holding a blank in operative relation to a cutter on the spindle, guiding means permitting vertical movements of the table in parallelism, a former and a former pin of which one is associated with the table and the other with the cutter spindle, and mechanism including a weight for pressing the table upward and thus holding the former and former pin in engagement, whereby vertical movements of the table to vary the depth of cut are effected simultaneously with the horizontal movements of the table.

10. In a milling machine, the combination of a rotatable horizontal cutter-carrying spindle normally fixed against bodily movement, a table horizontally movable at an angle to the spindle, longitudinally arranged means on the table for holding a blank in operative relation to a cutter on the spindle, guiding means permitting vertical movements of the table in parallelism, a former and a former pin of which one is associated with the table and the other with the cutter spindle, mechanism including a weight for pressing the table upward and thus holding the former and former pin in engagement, whereby vertical movements of the table to vary the depth of cut are effected simultaneously with the horizontal movements of the table, and mechanism for adjusting the weight to effect changes in the upward pressure applied to the table.

11. In a milling machine, the combination of a rotatable horizontal cutter-carrying spindle normally fixed against bodily movement, a table horizontally movable at an angle to the spindle, longitudinally arranged means on the table for holding a blank in operative relation to a cutter on the spindle, guiding means permitting vertical movements of the table in parallelism, a former and a former pin of which one is associated with the table and the other with the cutter spindle, mechanism including a weight for pressing the table upward and thus holding the former and former pin in engagement, whereby vertical movements of the table to vary the depth of cut are effected simultaneously with the horizontal movements of the table, and manually operable means for assisting or opposing the action of the weight.

12. In a milling machine, the combination of a rotatable horizontal cutter-carrying spindle normally fixed against bodily movement, a carriage guided for vertical movement in parallelism, a table mounted on the carriage and horizontally movable at an angle to the spindle, longitudinally arranged means on the table for holding a blank in operative relation to a cutter on the spindle, and a former and a former pin arranged to engage each other one being associated with the table and the other with the cutter spindle, whereby vertical movements of the carriage and the table to vary the depth of cut may be effected simultaneously with the horizontal movements of the table.

13. In a milling machine, the combination of a rotatable horizontal cutter-carrying spindle normally fixed against bodily movement, a vertically movable carriage, parallel motion links for guiding the vertical movements of the carriage, a table mounted on the carriage and horizontally movable at an angle to the spindle, longitudinally arranged means on the table for holding a blank in operative relation to a cutter on the spindle, and a former and a former pin arranged to engage each other one being associated with the table and the other with the cutter spindle, whereby vertical movements of the carriage and the table to vary the depth of cut may be effected simultaneously with the horizontal movements of the table.

14. In a milling machine, the combination of a rotatable horizontal cutter-carrying spindle normally fixed against bodily movement, a vertically movable carriage, guiding means for the carriage including parallel motion links and rollers acting at right angles to the links, a table mounted on the carriage and horizontally movable at an angle to the spindle, longitudinally arranged means on the table for holding a blank in operative relation to a cutter on the spindle, and a former and a former pin arranged to engage each other one being associated with the table and the other with the cutter spindle, whereby vertical movements of the carriage and the table to vary the depth of cut may be effected simultaneously with the horizontal movements of the table.

15. In a milling machine, the combination of a rotatable horizontal cutter-carrying spindle normally fixed against bodily movement, a carriage guided for vertical movement in parallelism, a table mounted on the carriage and horizontally movable at an angle to the spindle, longitudinally arranged means on the table for holding a blank in operative relation to a cutter on the spindle, a former and a former pin arranged to engage each other one being associated with the table and the other with the cutter spindle, and mechanism including a weight for pressing the carriage and table upward thus holding the former and former pin in engagement, whereby vertical movements of the carriage and the table to vary the depth of cut are effected simultaneously with the horizontal movements of the table.

16. In a milling machine, the combination of a rotatable horizontal cutter-carrying spindle normally fixed against bodily movement, a carriage guided for vertical movement in parallelism, a table mounted on the carriage and horizontally movable at an angle to the spindle, longitudinally arranged means on the table for holding a blank in operative relation to a cutter on the spindle, a former and a former pin arranged to engage each other one being associated with the table and the other with the cutter spindle, whereby vertical movements of the carriage and the table to vary the depth of cut may be effected simultaneously with the horizontal movements of the table, and manually operable means for pressing the carriage and table upward to hold the former and former pin in engagement.

17. In a milling machine, the combination of a rotatable horizontal cutter-carrying spindle normally fixed against bodily movement, a carriage guided for vertical movement in parallelism, a table mounted on the carriage and horizontally movable at an angle to the spindle, longitudinally arranged means on the table for holding a blank in operative relation to a cutter on the spindle, a former and a former pin arranged to engage each other one being associated with the table and the other with the cutter spindle, whereby vertical movements of the carriage and the table to vary the depth of cut may be effected simultaneously with the horizontal movements of the table, and an adjustable connection between the carriage and the manually operable means permitting the carriage to be raised or lowered independently of the said means.

18. In a milling machine, the combination of a rotatable horizontal cutter-carrying spindle normally fixed against bodily movement, a carriage guided for vertical movement in parallelism, a table mounted on the carriage and horizontally movable at an angle to the spindle, a longitudinally arranged means on the table for holding a blank in operative relation to a cutter on the spindle, a former and a former pin arranged to engage each other one being associated with the table and the other with the cutter spindle, mechanism including a weight for pressing the carriage and table upward thus holding the former and former pin in engagement, whereby vertical movements of the carriage and the table to vary the depth of cut are effected simultaneously with the horizontal movements of the table, and manually operable means for assisting or opposing the action of the weight.

19. In a milling machine, the combination of a rotatable horizontal cutter-carrying spindle normally fixed against bodily movement, a carriage guided for vertical movement in parallelism, a table mounted on the carriage and horizontally movable at an angle to the spindle, longitudinally arranged means on the table for holding a blank in operative relation to a cutter on the spindle, a former and a former pin automatically held in engagement with each other one being associated with the table and the other with the cutter spindle, whereby vertical movements of the carriage and the table to vary the depth of cut are effected simultaneously with the horizontal movements of the table, and means for locking the carriage and table against vertical movement.

20. In a milling machine, the combination of a rotatable horizontal cutter-carrying spindle normally fixed against bodily movement, a carriage guided for vertical movement in parallelism, a table mounted on the carriage and horizontally movable at an angle to the spindle, longitudinally arranged means on the table for holding a blank in operative relation to a cutter on the spindle, a former and a former pin automatically held in engagement with each other one being associated with the table and the other with the cutter spindle, whereby vertical movements of the carriage and the table to vary the depth of cut are effected simultaneously with the horizontal movements of the table, and means including a friction clamp for holding the carriage and table in any intermediate position and locking them against vertical movement.

21. In a milling machine, the combination of a rotatable horizontal cutter-carrying spindle normally fixed against bodily movement, a carriage guided for vertical movement in parallelism, a table mounted on the carriage and horizontally movable at an angle to the spindle, longitudinally arranged means on the table for holding a blank in operative relation to a cutter on the spindle, a former and a former pin arranged to engage each other one being associated with the table and the other with the cutter spindle, whereby vertical movements of the table to vary the depth of cut may be effected simultaneously with the horizontal movements of the table, and power feed mechanism for moving the table on the carriage, the said mechanism including a series of meshing spur gears one of which is movable with the carriage and another of which is fixed against bodily movement.

22. In a milling machine, the combination of a rotatable horizontal cutter-carrying spindle normally fixed against bodily movement, a carriage guided for vertical movement in parallelism, a table mounted on the carriage and horizontally movable at an angle to the spindle, longitudinally arranged means on the table for holding a blank in operative relation to a cutter on the spindle, a former and a former pin arranged to engage each other one being associated with the table and the other with the cutter spindle, whereby vertical movements of the table to vary the depth of cut may be effected simultaneously with the horizontal movements of the table, and power feed mechanism for moving the table on the carriage, the said mechanism including a series of meshing spur gears one of which is movable with the carriage and another of which is fixed against bodily movement, a non-rotary feed screw connected with the table and a nut engaging the feed screw and operated by the first said spur gear.

23. In a milling machine, the combination of a rotatable horizontal cutter-carrying spindle normally fixed against bodily movement, a carriage guided for vertical movement in parallelism, a table mounted on the carriage and horizontally movable at an angle to the spindle, longitudinally arranged means on the table for holding a blank in operative relation to a cutter on the spindle, a former and a former pin arranged to engage each other one being associated with the table and the other with the cutter spindle, whereby vertical movements of the table to vary the depth of cut may be effected simultaneously with the horizontal movements of the table, power feed mechanism for moving the table on the carriage, the said mechanism including a series of meshing spur gears one of which is movable with the carriage and another of which is fixed against bodily movement, means for interrupting the power feed, and manually operable means for utilizing the said spur gears to move the table when the power feed is interrupted.

24. In a milling machine, the combination of a rotatable horizontal cutter-carrying spindle normally fixed against bodily movement, a carriage guided for vertical movement in parallelism, a table mounted on the carriage and horizontally movable at an angle to the spindle, longitudinally arranged means on the table for holding a blank in operative relation to a cutter on the spindle, a former and a former pin arranged to engage each other one being associated with the table and the other with the cutter spindle, whereby vertical movements of the table to vary the depth of cut may be effected simultaneously with the horizontal movements of the table, power feed mechanism for moving the table on the carriage, and automatic stop mechanism for the feed including a pivoted finger, means for interrupting the power connection for the feed when the finger is swung on its pivot and a pin carried by the table and adapted to engage the finger to swing it.

25. In a milling machine, the combination of a rotatable horizontal cutter-carrying spindle normally fixed against bodily movement, a carriage guided for vertical movement in parallelism, a table mounted on the carriage and horizontally movable at an angle to the spindle, longitudinally arranged means on the table for holding a blank in operative relation to a cutter on the spindle, a former and a former pin arranged to engage each other one being associated with the table and the other with the cutter spindle, whereby vertical movements of the table to vary the depth of cut may be effected simultaneously with the horizontal movements of the table, power feed mechanism for moving the table on the carriage, automatic stop mechanism for the feed including a pivoted finger, means for interrupting the power connection for the feed when the finger is swung on its pivot and a pin carried by the table, and manually operable means for stopping and starting the feed without moving the finger.

In testimony whereof, I hereto affix my signature.

BENGT M. W. HANSON.

Copies of this patent may be obtained for five cents each, by addressing the "Commissioner of Patents, Washington, D. C."